(12) United States Patent
Lin et al.

(10) Patent No.: US 8,041,974 B2
(45) Date of Patent: Oct. 18, 2011

(54) POWER MANAGEMENT METHOD FOR INPUT DEVICE

(75) Inventors: Kuo-Hung Lin, Taipei County (TW); Chun-Yi Chen, Taipei County (TW)

(73) Assignee: Kinpo Electronics, Inc., New Taipei (TW)

( * ) Notice: Subject to any disclaimer, the term of this patent is extended or adjusted under 35 U.S.C. 154(b) by 448 days.

(21) Appl. No.: 12/352,249

(22) Filed: Jan. 12, 2009

(65) Prior Publication Data

US 2010/0100755 A1 Apr. 22, 2010

(30) Foreign Application Priority Data

Oct. 17, 2008 (TW) .............................. 97140052 A

(51) Int. Cl.
G06F 1/00 (2006.01)
G06F 1/26 (2006.01)
G06F 1/32 (2006.01)

(52) U.S. Cl. ......... 713/323; 713/300; 713/320; 713/324
(58) Field of Classification Search ........... 713/300–340
See application file for complete search history.

(56) References Cited

U.S. PATENT DOCUMENTS

| 6,266,776 | B1 * | 7/2001 | Sakai | 713/300 |
|---|---|---|---|---|
| 7,203,848 | B2 * | 4/2007 | Mitsubori et al. | 713/300 |
| 7,296,169 | B2 * | 11/2007 | Cheng et al. | 713/322 |
| 7,340,616 | B2 * | 3/2008 | Rothman et al. | 713/300 |
| 7,639,493 | B2 * | 12/2009 | Hori et al. | 361/679.4 |
| 7,778,160 | B2 * | 8/2010 | Kaiga et al. | 370/218 |
| 7,900,070 | B2 * | 3/2011 | Wu et al. | 713/320 |
| 7,965,667 | B2 * | 6/2011 | Tsai | 370/311 |
| 7,969,993 | B2 * | 6/2011 | Shimamura et al. | 370/401 |
| 2002/0075145 | A1 * | 6/2002 | Hardman et al. | 340/442 |
| 2006/0031694 | A1 * | 2/2006 | Lam | 713/323 |
| 2006/0068832 | A1 * | 3/2006 | Islam et al. | 455/528 |
| 2006/0107077 | A1 * | 5/2006 | Roth et al. | 713/300 |
| 2008/0043656 | A1 * | 2/2008 | Yoon et al. | 370/311 |
| 2008/0082845 | A1 * | 4/2008 | Morisawa | 713/323 |

(Continued)

FOREIGN PATENT DOCUMENTS

JP 2007088908 A * 4/2007

(Continued)

OTHER PUBLICATIONS

Yong He; Ruixi Yuan; , "A Novel Scheduled Power Saving Mechanism for 802.11 Wireless LANs," Mobile Computing, IEEE Transactions on , vol. 8, No. 10, pp. 1368-1383, Oct. 2009.*
Zhaohui Yuan; Gaofeng Wang; , "Power Management for Real-Time Tasks in Wireless Networked Embedded Systems," Computer Science and Software Engineering, 2008 International Conference on , vol. 4, No., pp. 118-121, Dec. 12-14, 2008.*

(Continued)

Primary Examiner — Faisal M Zaman
(74) Attorney, Agent, or Firm — J.C. Patents

(57) ABSTRACT

A power management method for an input device is provided, which includes the following steps: starting to count time and recording a trigger time of the input device after the input device enters a light-sleep mode; and dynamically updating a deep-sleep start time according to the trigger time. When the input device is idle over a standby time, the input device would enter the light-sleep mode and record the trigger time that the input device is restored from the light-sleep mode to an operation mode by a user operating the input device. The method dynamically updates the deep-sleep start time according to the recorded trigger time, and thus better power saving efficiency is achieved.

8 Claims, 4 Drawing Sheets

U.S. PATENT DOCUMENTS

| | | | |
|---|---|---|---|
| 2009/0215402 A1* | 8/2009 | Ng | 455/69 |
| 2009/0219846 A1* | 9/2009 | Chan et al. | 370/311 |
| 2010/0058093 A1* | 3/2010 | Danieli et al. | 713/340 |
| 2010/0246460 A1* | 9/2010 | Kholaif et al. | 370/311 |
| 2010/0284316 A1* | 11/2010 | Sampathkumar | 370/311 |
| 2011/0010222 A1* | 1/2011 | Choudhary et al. | 705/10 |

FOREIGN PATENT DOCUMENTS

| | | | |
|---|---|---|---|
| JP | 2007213136 A | * | 8/2007 |
| JP | 2009037371 A | * | 2/2009 |
| JP | 2009086363 A | * | 4/2009 |
| JP | 2010257284 A | * | 11/2010 |
| JP | 2010277432 A | * | 12/2010 |
| JP | 2011037174 A | * | 2/2011 |

OTHER PUBLICATIONS

Pérez-Costa, X.; Camps-Mur, D.; , "IEEE 802.11E QoS and power saving features overview and analysis of combined performance [Accepted from Open Call]," Wireless Communications, IEEE , vol. 17, No. 4, pp. 88-96, Aug. 2010.*

Xue, C.J.; Zhaohui Yuan; Guoliang Xing; Zili Shao; Sha, E.; , "Energy Efficient Operating Mode Assignment for Real-Time Tasks in Wireless Embedded Systems," Embedded and Real-Time Computing Systems and Applications, 2008. RTCSA '08. 14th IEEE International Conference on , pp. 237-246, Aug. 25-27, 2008.*

* cited by examiner

| Recording sequence of index value | Index record value |
|---|---|
| 1 | 3 |
| 2 | 13 |
| 3 | 1 |
| 4 | 6 |
| 5 | 3 |
| 6 | 12 |
| 7 | 2 |
| 8 | 8 |
| Average index value | 6 |
| Sleep start time | 65 |

FIG. 2A

| Recording sequence of index value | Index record value |
|---|---|
| 1 | 13 |
| 2 | 1 |
| 3 | 6 |
| 4 | 3 |
| 5 | 12 |
| 6 | 2 |
| 7 | 8 |
| 8 | 4 |
| Average index value | 7 |
| Sleep start time | 75 |

FIG. 2B

POWER MANAGEMENT METHOD FOR INPUT DEVICE

CROSS-REFERENCE TO RELATED APPLICATION

This application claims the priority benefit of Taiwan application serial no. 97140052, filed Oct. 17, 2008. The entirety of the above-mentioned patent application is hereby incorporated by reference herein and made a part of specification.

BACKGROUND OF THE INVENTION

1. Field of the Invention

The present invention relates to a power management method and particularly to a power saving method for dynamically adjusting the time that an input device (a wireless mouse, for example) enters a power saving mode according to the usage states thereof.

2. Description of Related Art

In recent years, computer-related accessories are being developed to have wireless function. Wireless mice are especially popular among all. A wireless mouse features that the data in the mouse is transmitted back to the computer via wireless transmission, and therefore does not require a connection wire. However, without the connection wire, the wireless mouse can not receive power supply from the computer and has to rely on a battery as the power source, which is fairly limited. To prevent the inconvenience of replacing batteries or charging batteries frequently, it is necessary to take power consumption and power management into consideration when designing a wireless mouse, so as to extend the usage time of the mouse.

A commonly-adopted power saving method of wireless mice is to turn off a movement sensing module and a wireless transmission module for saving power when the mouse is idle, and activate the turned-off modules when a user clicks on the mouse. However, it is difficult to determine whether the mouse is idle. Generally, an idle timer is designed in the firmware of the mouse. The idle timer begins to count time when the mouse is not operated by the user, and allows the mouse to enter power saving mode when the mouse is idle over a predetermined time. The predetermined time of the timer is usually a fixed value. However, the user's patterns of operating the mouse may differ according to his/her purposes of use. If the predetermined time is set too short, the status of the mouse may not be judged accurately to comply with the user's operation which has a longer operating interval; on the contrary, if the predetermined time is set too long, the power saving efficiency may be impaired.

SUMMARY OF THE INVENTION

Accordingly, the present invention provides a method for managing the power of a wireless mouse according to the usage states thereof. Through recording a usage pattern of a user within a period of time, the wireless mouse selects a proper idle time setting for dynamically adjusting the time of entering a power saving mode based on the usage states thereof. Consequently, better power saving efficiency is achieved without influencing the use of the wireless mouse.

Based on the above, the present invention provides a power management method for an input device, including the following steps: starting to count time and recording a trigger time of the input device after the input device enters a light-sleep mode; updating a deeper-sleep start time (or called a deep-sleep start time) according to the trigger time; and entering a deeper sleep mode (or called a deep-sleep mode) when the input device is idle over the deeper-sleep start time.

According to one embodiment of the present invention, the input device enters the light-sleep mode when the input device is idle over a fixed time. When entering the light-sleep mode, the input device activates a detection to record the trigger time that the input device is restored to an operation mode by the user operating the input device.

According to one embodiment of the present invention, the step of recording the trigger time further includes: activating a timer when the input device enters the light-sleep mode, recording a time value (i.e. the trigger time) when detecting that the mouse is operated, correspondingly recording an index value according to a relationship between the time value and a plurality of time intervals, and updating an oldest index record value with the recorded index value.

According to one embodiment of the present invention, eight groups of the latest index record values are recorded in total.

According to one embodiment of the present invention, the step of updating the deeper-sleep start time based on the eight groups of the latest index record values further includes: updating the oldest index value with the new index value based on a recording sequence and recording N groups of records; wherein N is a positive integer; and updating the deeper-sleep start time with the index record values.

According to one embodiment of the present invention, the step of updating the deeper-sleep start time based on the index values further includes: calculating an average index value based on an accumulated value of the index values; and using a sum of the average index value, a weighted value, and an intermediate value of a time interval to update the deeper-sleep start time.

According to one embodiment of the present invention, the power management method further includes the following step: updating a deeper-sleep start time based on the trigger time; and entering a deeper sleep mode when the input device is idle over the deeper-sleep start time.

According to one embodiment of the present invention, the step of updating the index record values further includes: stopping counting time and correspondingly recording a weighted index value according to the deep-sleep start time, and updating the oldest index record value with the weighted index value, when the input device is idle and enters the deep-sleep mode, wherein the weighted index value is larger than one of the index values which corresponds to the deep-sleep start time.

According to one embodiment of the present invention, the input device is a wireless mouse, a wired mouse, or a keyboard; and the trigger time represents the time that the input device is restored to the operation mode by the operation of the user, i.e. an interval time interval that the input device enters the light-sleep mode and returns to the operation mode between two consecutive operations (movement or click) of the user.

Through recording the usage patterns of the user, the present invention selects a proper idle time for the wireless mouse to dynamically vary the time of entering power saving mode, and thereby increases power saving efficiency without influencing the use of the wireless mouse.

To make the above features and advantages of the present invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 2A and FIG. 2B are comparison tables of index values and sleep start times of this embodiment.

DESCRIPTION OF EMBODIMENTS

Different users may have different patterns of using an input device (a mouse, for instance). Accordingly, the present invention is to record the users' patterns and dynamically adjust a sleep start time that the mouse enters a power-saving mode, based on the usage states thereof. When a time interval of operating the mouse is short, such as browsing through web pages, the present invention sets a deep-sleep start time of the mouse shorter. When the time interval of operating the mouse is long, such as word processing, the present invention sets the deep-sleep start time of the mouse longer, so as to meet the users' requirements and habits.

Figure 1:
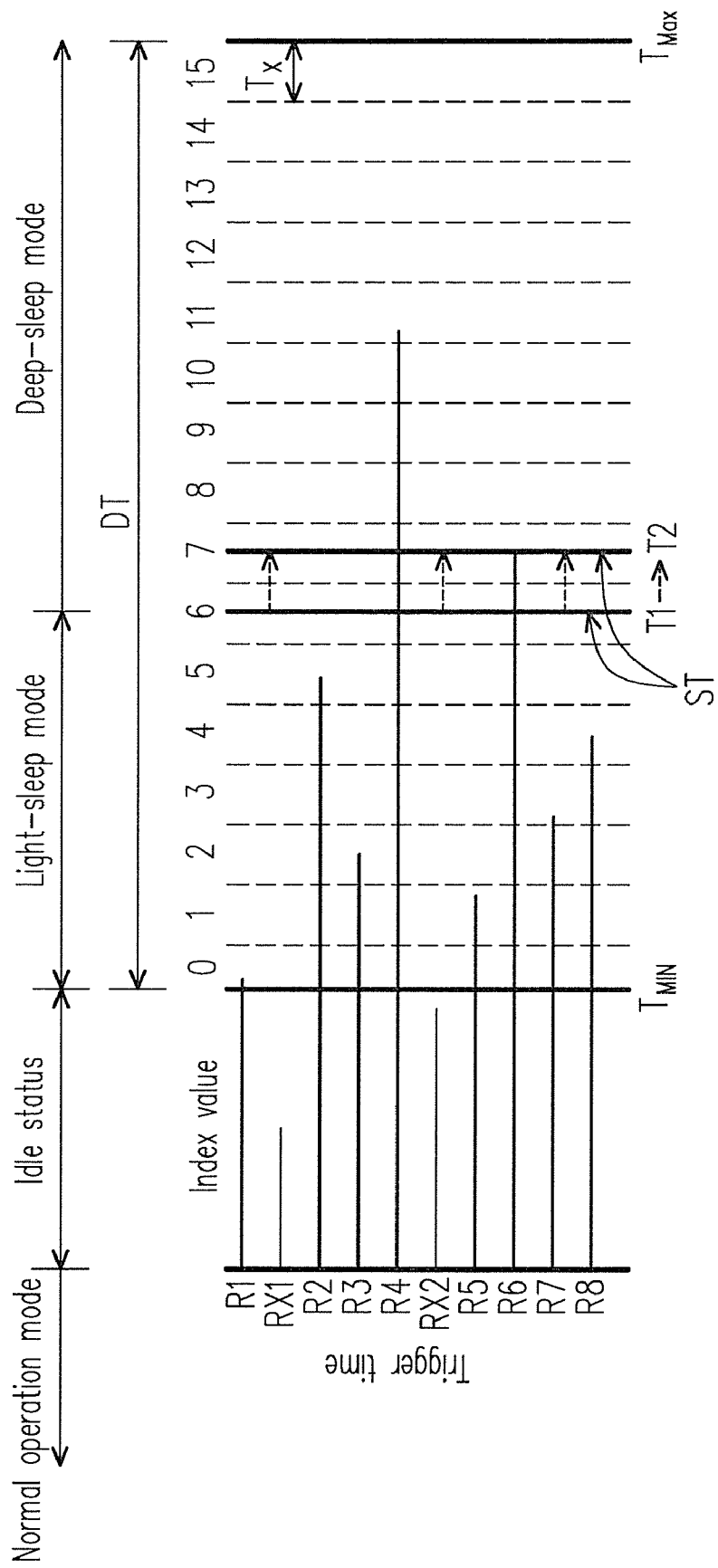
FIG. 1 is a diagram illustrating a method for calculating a sleep start time of a mouse according to an embodiment of the present invention.

In the following paragraphs, a mouse is taken as an example to explain a power management method of an input device according to the present invention. Referring to FIG. 1, FIG. 1 is a diagram illustrating a method for calculating a sleep start time of the mouse according to one embodiment of the present invention. Device status indicates a current mode of the mouse, wherein a normal operation mode represents that the mouse is being used normally. When the user stops using the mouse, the mouse enters an idle status, and a timer is used by a system to count a trigger time. The trigger time is an interval time that the input device is restored from a light-sleep mode to an operation mode due to the operation of the user.

An index value (0~15) is correspondingly recorded according to the length of the trigger time (i.e. the portions of the idle times R1~R8, which exceed a fixed time $T_{MIN}$, as indicated by the transverse lines). The index value is determined based on time intervals. In this embodiment, a detection period DT is set between the fixed time $T_{MIN}$ and an upper limit value $T_{MAX}$, wherein the input device enters the light-sleep mode when being idle over the fixed time $T_{MIN}$. The detection period DT is divided into a plurality of time intervals, and each of the time intervals is corresponding to one index value. In this embodiment, the detection period is separated into sixteen time intervals ($T_x$, for example) so as to respectively correspond to index values 0~15. After the input device enters the light-sleep mode, the timer is automatically activated to record the trigger time. For instance, the index value corresponding to the idle time R1 is 0 (for the trigger time corresponds to the first time interval), the index value corresponding to the idle time R2 is 5 (for the trigger time corresponds to the fifth time interval), and other index values may be obtained accordingly. When a new trigger time is detected, the index value corresponding to the new trigger time is used to update an earliest-recorded index record value (i.e. an oldest index record value), so as to dynamically update a deep-sleep start time ST.

When the mouse is idle over the deep-sleep start time ST, the mouse enters a deep-sleep mode so as to further reduce power consumption. In the meantime, the timer may stop counting time and update an oldest (the earliest) index record value with a weighted index value corresponding to the deep-sleep start time ST, so as to meet the requirements of power saving. The weighted index value is larger than the index value corresponding to the current deep-sleep start time ST. For instance, in this embodiment, a predetermined value is added to the index value corresponding to the deep-sleep start time ST or the index value corresponding to the deep-sleep start time ST is multiplied to serve as the weighted index value. In other words, every time the mouse enters the light-sleep mode, the system dynamically updates the deep-sleep start time ST based on the length of the trigger time. Additionally, the settings of the index value and the weighted index value may be varied according to the user's designs and requirements, and are not limited by this embodiment.

The deep-sleep start time ST is calculated based on the recorded index value (i.e. index record value) and is dynamically adjusted according to a newly detected trigger time. In this embodiment, provided that the deep-sleep start time ST is a time T1, when a new idle time R8 is received, the deep-sleep start time ST would be updated to a time T2 based on the index value (4) which corresponds to the trigger time R8. Hence, after the idle time R8 is received, the deep-sleep start time for the mouse to enter the deep-sleep mode is recalculated and modified to T2. That is, this embodiment dynamically updates the deep-sleep start time ST, based on the usage patterns of the user, and controls the mouse to enter the deep-sleep mode at a proper timing, so as to meet different requirements. A formula for calculating the deep-sleep start time ST to be updated is given below:

$$I = \frac{1}{N}\sum_{i=1}^{N} R_i$$

$$T2 = T_{MIDDLE} + a \times I$$

Herein, "I" represents an average index value of N index record values, "N" represents a sampling number (which is 8 in this embodiment), "$R_i$" represents the index value that corresponds to the trigger time, and Parameter "a" represents the length of the time intervals, which may be 10 seconds, for example. It is noted that the average index value I may be rounded up or down to be an integer. According to this embodiment, the average index value I falls between 0~15. Moreover, $T_{MIDDLE}$ signifies an intermediate value of the time interval; for instance, the intermediate value of a 10-second time interval is 5 seconds. "T2" represents the value of the updated deep-sleep start time ST.

Based on the above formula, it is known that this embodiment adopts the average value of eight index record values to dynamically update the deep-sleep start time ST. When a new trigger time, e.g. R8, is obtained, the mouse would update the oldest (the earliest record) index record value, which has been used to calculate the average index value I, with the corresponding index value (4), based on the recording sequence. That is to say, the calculation of the average index value I merely requires eight index record values. When a new index value is received, the new index value is used to replace an old index record value, so as to renew the average index value I, and thereby dynamically update the deep-sleep start time ST.

In addition, it is noted that the sampling number N of this embodiment is not limited to 8. The sampling number N may also be 10, 20, or other numbers. Furthermore, the calculation of the deep-sleep start time ST is not limited to the aforementioned formula and may be varied to meet different requirements and designs. The parameter "a" and the intermediate value $T_{MIDDLE}$ may also be varied based on different designs. Hence, the present invention is not limited to the above examples. Moreover, the index value which corresponds to each time interval may be adjusted for different designs and requirements, and therefore is not limited to 0~15. In addition, "I" is not necessarily an arithmetic mean, and "I" may also be a mode, a weighted average, or so forth. Based on the designs and requirements, the timer may be stopped after the mouse enters the deep-sleep mode, and therefore, the last recorded idle time (R8, for instance) is equal to the current deep-sleep start time ST. Accordingly, a weighted value is added to extend the idle time so as to obtain a longer idle time for replacing the current record. The previously recorded idle time (R4) may be larger than the current deep-sleep start time ST. The reason is that the value of the deep-sleep start time ST, at the time the recorded idle time R4 is recoded, is greater than the value corresponding to the recorded idle time (R4).

Further, FIG. 2A and FIG. 2B illustrate comparison tables of the index record values and the sleep start times of the embodiment. As shown in FIG. 2A, provided that the sequentially recorded eight index record values are 3, 13, 1, 6, 3, 12, 2, and 8, the average index value thereof is 6 (the value has been rounded up or down to be an integer), and the corresponding deep-sleep start time ST is updated to 65 (seconds) (based on a=10). Referring to FIG. 2B, provided that the sequentially recorded eight index record values are 13, 1, 6, 3, 12, 2, 8, and 4, the average index value thereof is 7 (the value has been rounded up or down to be an integer), and the corresponding deep-sleep start time ST is updated to 75 (seconds)(based on a=10; $T_{MIDDLE}$=5). The average index values of other combinations and the corresponding deep-sleep start times ST thereof may be obtained based on the above method. Thus, the detailed descriptions are not repeated here.

It should also be noted that the mouse may have sleep modes of various degrees, and the mouse may enter different sleep modes according to the length of the idle time. Hence, this embodiment is not only suitable for setting the start time of the deep-sleep mode but also applicable to sleep modes of various degrees. Through setting the corresponding detection periods, adding index record tables (for recording the corresponding index values), and setting the corresponding timers, the present invention may dynamically update the start times of various sleep modes. Persons having ordinary skill in the art may easily achieve the above based on the aforementioned embodiment. Hence, the detailed descriptions are not repeated here.

Figure 3:
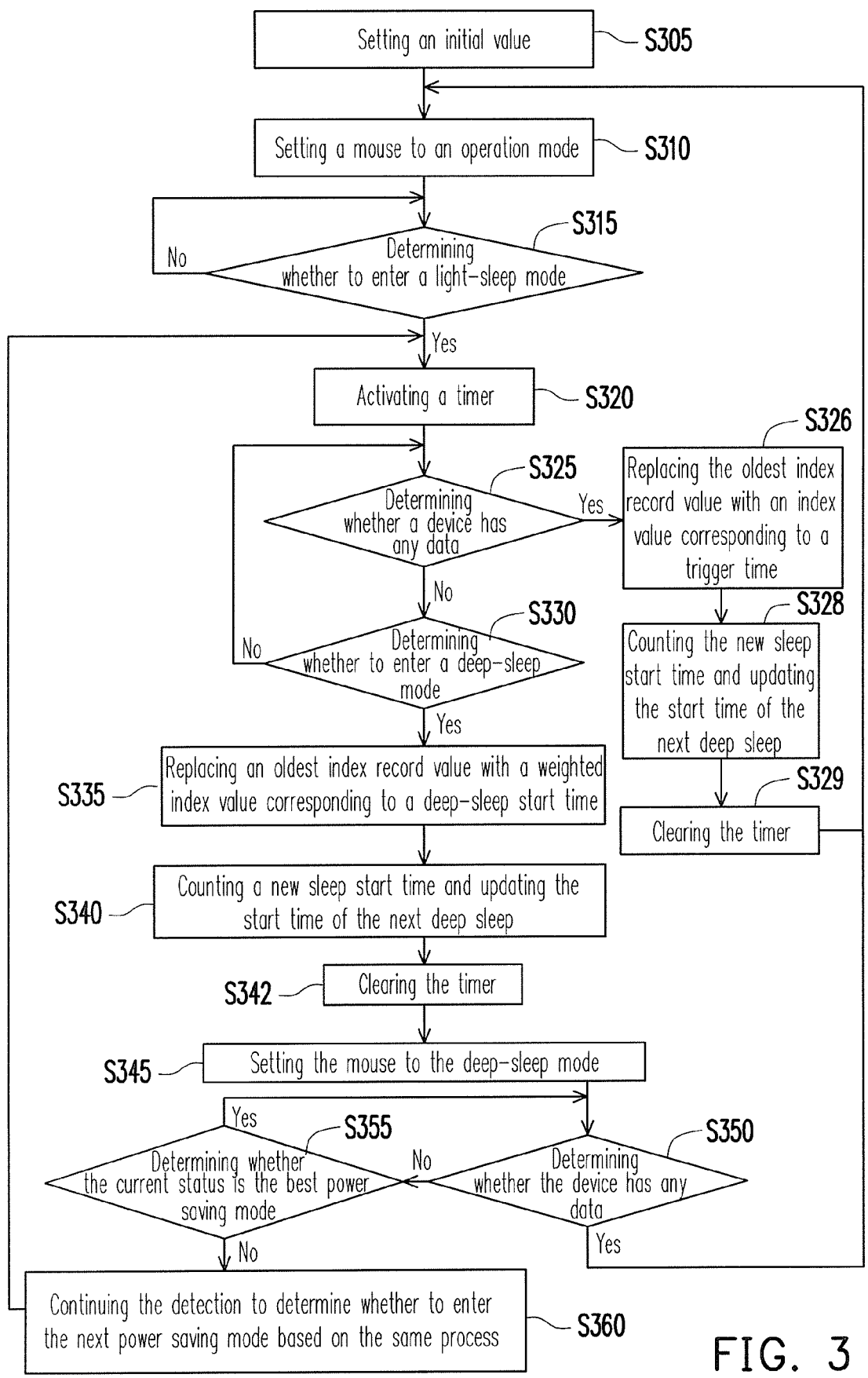
FIG. 3 is a process flow illustrating a power management method of a mouse according to this embodiment.

In view of the above, a power management method of a mouse, as shown in FIG. 3, is concluded based on this embodiment. FIG. 3 is a process flow illustrating the power management method of the mouse according to this embodiment. An initial value is set first, which is to set each index value and a parameter of an initial deep-sleep start time ST to an appropriate initial value. For instance, the intermediate value of 0~15, which is 7, is used as the index value to calculate that the initial deep-sleep start time ST is 75 (Step S305). Then, the mouse is set to an operation mode (Step S310). Next, the mouse is determined whether to enter a light-sleep mode or not (i.e. determining whether an idle time is larger than a fixed time) (Step S315). If the idle time is larger than the fixed time, a timer is activated to count a trigger time of the mouse. If a user operates the mouse during the counting so that the mouse outputs data or signals (Step S325), an oldest index record value is replaced by the index value corresponding to the trigger time (Step S326). Then, a new deep-sleep start time is counted based on the current record and the start time of the next deep sleep is updated (Step S328). Following that, the timer is cleared (Step S329), and the process goes back to Step S310 to set the mouse to the operation mode.

If the mouse is not operated, the mouse is determined whether to enter a deep-sleep mode (Step S330). If not, the process goes back to Step S325 so as to continue detecting the operation of the user; If the mouse is to enter the deep-sleep mode, the index value corresponding to the current trigger time is calculated based on a weighted method (for example, a weighted value, 3, is added. If the weighted index value exceeds $T_{MAX}$, the index value corresponding to $T_{MAX}$ is adopted) so as to obtain a weighted index value for replacing the oldest index record value (Step S335). Thereafter, a new sleep start time is counted and the start time of the next deep sleep is updated (Step S340). Then, the timer is cleared (Step S342). Following that, the mouse is set to the deep-sleep mode (Step S345). Next, whether the mouse is operated by the user is determined (Step S350). If yes, the process goes back to Step S310; if not, whether the current status is the best power saving mode is determined (Step S355). If the setting of the best power saving mode is completed, the same process may be based on to continue detecting whether to enter the next power saving mode (one index value recording table is required for each additional power saving mode)(Step S360).

Referring to the process flow in FIG. 3, it is noted that the mouse may continue detecting whether the mouse is operated by the user (detecting any movement or click). If the mouse is operated, the mouse is instantly set to the operation mode. However, the detecting process is not limited to the Steps S325 and S350. Moreover, when the mouse obtains a new index value, the mouse dynamically updates the sleep start time based on the calculating formula of the new index value and the sleep start time. In this embodiment, the calculation is completed by the mouse. However, if the counting of the deep-sleep start time is performed when the mouse updates the index value during light-sleep mode, the system may be overburdened and result in response delay. Hence, the calculation for update may also be carried out only before the mouse enters deep-sleep mode. The calculation and storage of the sleep start time may be carried out by the mouse or by the system (a computer host, for example), and are not limited by the disclosure of this embodiment.

Figure 4:
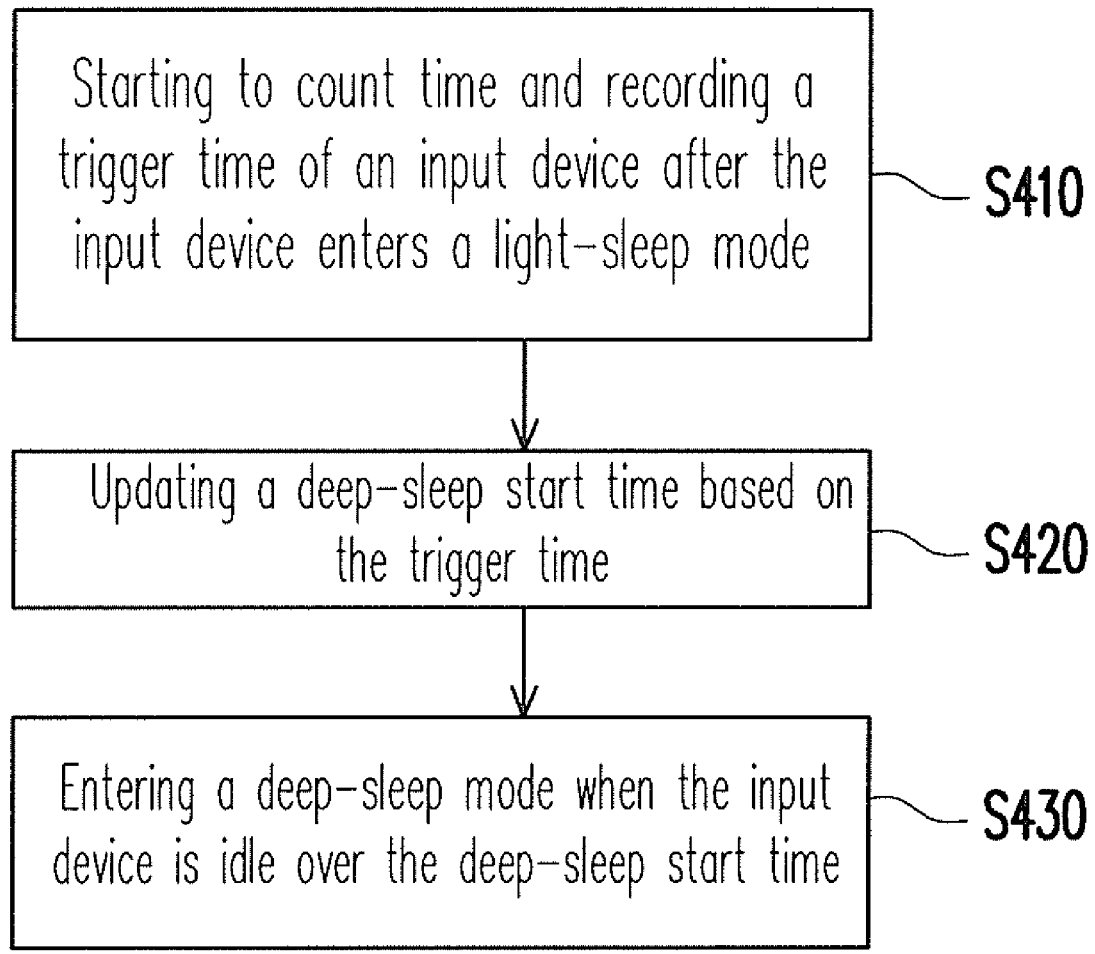
FIG. 4 is a process flow illustrating a power management method of an input device according to this embodiment.

In view of the content of the above embodiment, the present invention concludes a power management method of an input device (such as a wireless mouse, a wired mouse, or a keyboard) for dynamically adjusting a start time that the input device enters a power saving mode according to a detected trigger time. Referring to FIG. 4, FIG. 4 is a process flow illustrating the power management method of the input device according to the embodiment. First, the input device starts to count time and records a trigger time of the input device after entering a light-sleep mode (Step S410). In this step, an index value is obtained according to a time interval corresponding to the trigger time. Then, a deep-sleep start time is updated based on the index value corresponding to the trigger time (Step S420). The formula for calculating the deep-sleep start time has been described in the foregoing paragraphs. Whenever a new index value is obtained, the deep-sleep start time is updated accordingly. Thereafter, when the input device is idle over the deep-sleep start time, the input device enters a sleep mode (Step S430).

It should be noted that, if the input device is required to have sleep modes of various degrees, different detection periods may be set to the input device. After repeating Steps S410~S430, the start times of different sleep modes may be dynamically updated. Moreover, if the detection period includes various sleep modes, different sampling numbers or index values may be adopted in Step S420 to simultaneously set the start times of different sleep modes. The input device may switch between different power saving modes and decide when to enter a better power saving mode. Descriptions of the details in FIG. 4 may be referred to in the above embodiment and therefore not repeated here.

Additionally, the power management method of this embodiment is applicable not only to wireless or wired mice but also to other input devices which have power saving requirements, such as a wireless keyboard. Similarly, the wireless keyboard may also be set to the best sleep start time based on the trigger time thereof. Hence, this embodiment does not restrict the types of the input devices to be used. Application of the present invention can be easily deduced by those having ordinary skill in the art based on the disclosure of the present invention, and therefore will not be described here.

To conclude, the present invention provides the method for detecting the user's habits and thereby selecting a proper sleep start time which allows the wireless mouse to dynamically adjust the time for entering power saving mode. Consequently, better power saving efficiency is achieved without influencing the use of the mouse.

Although the present invention has been disclosed by the above preferable embodiments, they are not intended to limit the present invention. Anybody with ordinary knowledge in the art may make some modifications and alterations without departing from the spirit and scope of the present invention. Therefore, the scope for which protection is sought by the present invention falls in the appended claims.

What is claimed is:

1. A power management method for an input device, comprising:
    starting to count time and recording a trigger time of the input device after the input device enters a light-sleep mode, wherein the input device enters the light-sleep mode when the input device is idle over a fixed time;
    updating a deep-sleep start time according to the trigger time; and
    entering a deep-sleep mode when the input device is idle over the deep-sleep start time,
    wherein the step of recording the trigger time further comprises:
    activating a timer to obtain the trigger time after entering the light-sleep mode;
    setting a detection period between the fixed time and an upper limit value, and dividing the detection period into a plurality of time intervals respectively corresponding to a plurality of index values; and
    recording one of the index values according to one of the time intervals that corresponds to the trigger time.

2. The power management method as claimed in claim 1, wherein the step of updating the deep-sleep start time according to the trigger time further comprises:
    based on a recording sequence, updating an oldest index record value of N index record values with one of the index values that corresponds to the trigger time, wherein N is a positive integer; and
    updating the deep-sleep start time according to the index record values.

3. The power management method as claimed in claim 2, wherein N is equal to 8.

4. The power management method as claimed in claim 2, wherein the step of updating the deep-sleep start time according to the index record values further comprises:
    calculating an average index value based on an accumulated value of the index record values; and updating the sleep start time according to the average index value, the length of the time interval, and an intermediate value of the time interval.

5. The power management method as claimed in claim 4, wherein the step of updating the deep-sleep start time according to the average index value, the length of the time interval, and the intermediate value of the time interval further comprises:
    updating the deep-sleep start time with a sum of a product of the average index value and the time interval and the intermediate value of the time interval.

6. The power management method as claimed in claim 2, wherein the step of updating the index record values further comprises:
    stopping counting time and recording a weighted index value according to the deep-sleep start time, and updating the oldest index record value with the weighted index value, when the input device is idle and enters the deep-sleep mode, wherein the weighted index value is larger than one of the index values which is corresponding to the deep-sleep start time.

7. The power management method as claimed in claim 1, wherein the trigger time is an interval time that the input device is restored from a light-sleep mode to an operation mode by a user operating the input device.

8. The power management method as claimed in claim 1, wherein the input device is a wireless mouse, a wired mouse or a keyboard.

* * * * *